(12) United States Patent
Moroney et al.

(10) Patent No.: US 12,285,916 B2
(45) Date of Patent: Apr. 29, 2025

(54) GRAPHICAL ELEMENT SURFACE DISPLACEMENTS BASED ON DISTANCE FUNCTIONS

(71) Applicant: PERIDOT PRINT LLC, Palo Alto, CA (US)

(72) Inventors: Nathan Moroney, Palo Alto, CA (US); Scott A White, Boise, ID (US); Ji Won Jun, Palo Alto, CA (US)

(73) Assignee: PERIDOT PRINT LLC, Palo Alto, CA (US)

( * ) Notice: Subject to any disclaimer, the term of this patent is extended or adjusted under 35 U.S.C. 154(b) by 316 days.

(21) Appl. No.: 17/792,668

(22) PCT Filed: Jan. 29, 2020

(86) PCT No.: PCT/US2020/015566
§ 371 (c)(1),
(2) Date: Jul. 13, 2022

(87) PCT Pub. No.: WO2021/154229
PCT Pub. Date: Aug. 5, 2021

(65) Prior Publication Data
US 2023/0038217 A1    Feb. 9, 2023

(51) Int. Cl.
*B29C 64/386* (2017.01)
*B33Y 50/00* (2015.01)
(Continued)

(52) U.S. Cl.
CPC ............ *B29C 64/386* (2017.08); *B33Y 50/00* (2014.12); *G05B 19/4099* (2013.01); *G06T 17/20* (2013.01); *G06T 19/20* (2013.01); *G05B 2219/49023* (2013.01); *G06T 2219/2021* (2013.01)

(58) Field of Classification Search
CPC ....... B29C 64/386; B33Y 50/00; B33Y 10/00; B33Y 30/00; B33Y 50/02; G05B 19/4099; G05B 2219/49023; G06T 17/20; G06T 19/20; G06T 2219/2021
See application file for complete search history.

(56) References Cited

U.S. PATENT DOCUMENTS 9,446,585 B2 * 9/2016 Goyal .................. B41J 3/36
9,946,816 B2 * 4/2018 Kim .................... G06T 17/00
(Continued)

FOREIGN PATENT DOCUMENTS

GB          2540791 A    2/2017
WO     2019/042632 A1   3/2019

*Primary Examiner* — Ramesh B Patel
(74) *Attorney, Agent, or Firm* — Shook, Hardy & Bacon L.L.P.

(57) ABSTRACT

Systems and methods are described herein to determine positive or negative displacement distances for each pixel of an image of a graphical element. A displacement subsystem may determine surface displacement distances based on a function of a distance of each pixel to a nearest edge pixel of the image of the graphical element. A mapping subsystem may generate a surface displacement map of the graphical element to be applied to a surface of a three-dimensional object. The surface displacement map may be used to generate a mesh file and/or transmitted to a three-dimensional printing for printing on a surface of an object.

16 Claims, 16 Drawing Sheets

(51) Int. Cl.
*G05B 19/4099* (2006.01)
*G06T 17/20* (2006.01)
*G06T 19/20* (2011.01)

(56) References Cited

U.S. PATENT DOCUMENTS

| | | | |
|---|---|---|---|
| 10,061,870 B2 * | 8/2018 | Nelaturi | B33Y 50/02 |
| 10,286,716 B2 * | 5/2019 | Hersch | B42D 25/324 |
| 11,270,103 B2 * | 3/2022 | Rhoads | G06V 30/347 |
| 11,704,765 B2 * | 7/2023 | Kamath | G06F 16/1858 |
| | | | 382/100 |
| 11,927,965 B2 * | 3/2024 | Ebrahimi Afrouzi | |
| | | | G06F 3/04845 |
| 11,928,833 B2 * | 3/2024 | Moroney | B29C 64/386 |
| 2006/0077209 A1 * | 4/2006 | Bastos | G06T 3/40 |
| | | | 345/614 |
| 2007/0019083 A1 * | 1/2007 | Nakashima | H04N 23/80 |
| | | | 348/222.1 |
| 2008/0129733 A1 * | 6/2008 | Andersson | G06T 15/80 |
| | | | 345/426 |
| 2012/0095982 A1 * | 4/2012 | Lennington | G06V 20/00 |
| | | | 707/E17.069 |
| 2019/0213705 A1 * | 7/2019 | Kamath | G06N 3/045 |
| 2020/0320660 A1 * | 10/2020 | Kamath | G06N 3/084 |
| 2020/0387699 A1 * | 12/2020 | Haverkate | G06T 11/203 |
| 2022/0044432 A1 * | 2/2022 | Moroney | G06T 17/205 |
| 2022/0260967 A1 * | 8/2022 | Moroney | G06T 17/00 |
| 2024/0104682 A1 * | 3/2024 | Kamath | G06T 11/20 |

* cited by examiner

GRAPHICAL ELEMENT SURFACE DISPLACEMENTS BASED ON DISTANCE FUNCTIONS

BACKGROUND

Three-dimensional (3D) printers process 3D print files that may identify locations for material to be deposited within a spatial region. Text, images, designs, patterns, and other graphical elements may be printed on the surface of a 3D-printed object as raised or intended features. In some instances, a designer may customize the depth/height, shape, and size of graphical elements to fit on the surface of a 3D printed object. 3D print design software may export a mesh file that defines an object using polygons and references points in X, Y and Z axes to define the object in terms of height, width and depth.

3D printing techniques include additive manufacturing approaches in which material is added until an object is formed. For example, material may be added by forming several layers of material with each layer stacked on top of the previous layer. Examples of 3D printing techniques include fused filament fabrication, resin-based stereolithography, sintering, melting, or binding powder in layers via selective laser sintering or melting, multijet fusion, metaljet fusion, or the like.

BRIEF DESCRIPTION OF THE DRAWINGS

Non-limiting and non-exhaustive examples of the disclosure are described, including various examples of the disclosure, with reference to the figures, in which.

DETAILED DESCRIPTION

Figure 1A:
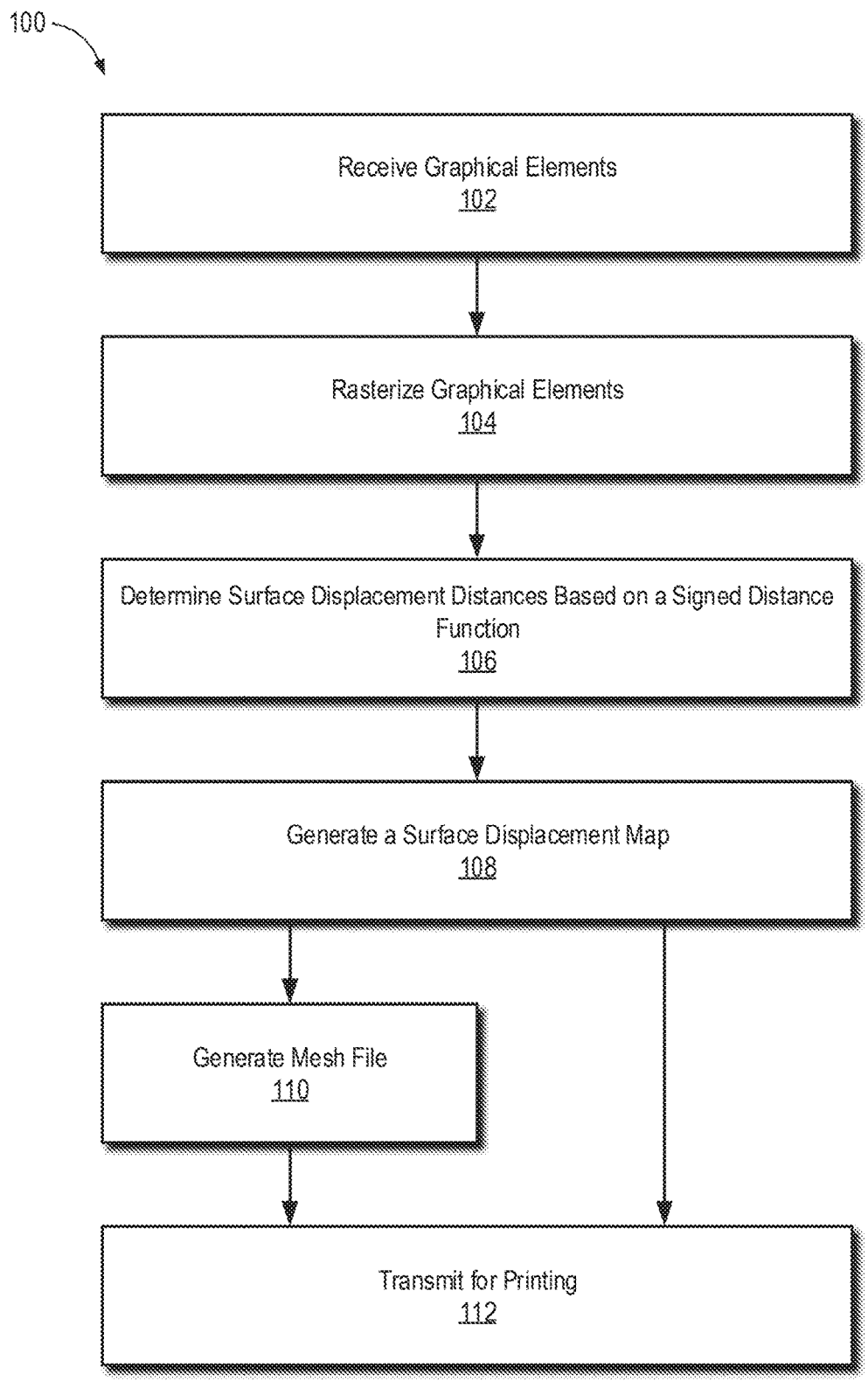
FIG. 1A illustrates a flow diagram of an example system to generate a mesh file or 3D-printed object that includes graphical elements with surface displacements defined by a distance-to-edge function.

Texture mapping in three-dimensional printing can be implemented by creating recesses or protrusions to produce graphical elements on the surface of three-dimensionally printed objects. A displacement map may specify displacement distances for each pixel of a graphical element. The displacements distances may represent recesses in the surface of an object as negative displacement distance values and protrusions from the surface of the object as positive displacement distance values. The displacement values may be saved, stored, and/or transmitted as mesh files that specify the displacement distances from a surface.

In some examples, the displacement map mesh of the graphical element may be encoded as grey-scale values with, for example, the flat surface shown as a middle grey, positive displacement values shown lighter grey approaching white, and negative displacement values shown darker grey approaching black.

In some instances, the system may receive a graphical element as a non-image file. The system may rasterize the non-image graphical element to generate a pixel-based image of the graphical element. For example, the system may receive a string of digitally encoded text or a design. The text or design may be rasterized to generate a pixel-based image of the same. The system may receive and rasterize any of a wide variety of formats to generate a corresponding pixel-based graphical element. Examples of graphical elements include text, icons, images, designs, letters, numbers, alphanumeric characters, pictures, geometric shapes, and/or combinations thereof. In other instances, the system may directly receive a pixel-based graphical element that does not require rasterization.

The system may access a distance function for calculating displacement distances of each pixel of the graphical element based on a distance from each respective pixel to a nearest edge pixel of the graphical element (referred to herein as a "distance-to-edge"). For example, a first set of pixels, referred to as "internal pixels," of a graphical element are bordered in all directions by other pixels of the graphical element. In contrast, a second set of pixels, referred to as "edge pixels," are not bordered by another pixel of the graphical element in at least one direction (e.g., in a direction perpendicular to a side of the pixel and/or in a direction between two sides of the pixel).

Using the letter "O" as an example of a graphical element, the graphical element may have a number of internal pixels that are bordered on all sides by other pixels of the letter. The letter "O" also includes edge pixels that define the outer ring of the "O" and edge pixels that define the inner ring of the "O" Using the word "HELLO" as an example of a graphical element, edge pixels form the perimeter of each character in the word "HELLO." The number of internal pixels in each character depends on the resolution of the pixel-based image of the graphical element.

In other examples, edge pixels may define the perimeters of text, icons, images, designs, letters, numbers, alphanumeric characters, pictures, geometric shapes, and/or combinations thereof. A distance from each pixel to a nearest edge pixel may be defined, for example, in terms of the number of pixels, millimeters, or another absolute or relative measurement unit. In some examples, the distance from an edge pixel to a nearest edge pixel (i.e., itself) is defined as zero (0), such that an adjacent internal pixel has a distance-to-edge value of 1 pixel, or an equivalent absolute measurement unit.

In other examples, the distance from an edge pixel to a nearest edge pixel (i.e., itself) may be defined as one (1), such that an adjacent internal pixel has a distance-to-edge value of 2 pixels, or an equivalent absolute measurement. For instance, if each pixel measures 0.01 millimeters, a distance of an edge pixel to a nearest edge pixel would be 0.01 millimeters and a distance of an adjacent internal pixel to a nearest edge pixel would be 0.02 millimeters.

The distance of each pixel to a nearest edge pixel may be referred to as a "distance-to-edge." A distance-to-edge function, also referred to herein as a distance function, defines surface displacement distances for each pixel as a function of the distance of each pixel to a nearest edge pixel. In some examples, the distance function may be a fixed function stored in memory. In other examples, the distance function may be provided by a user. In still other examples, the distance function may be selected from a set of stored distance functions. Once a distance function is identified, the system may determine surface displacement distances for each pixel of the image of the graphical element using the distance function.

Many of the examples described herein are described in the context of pixel-based images. It is appreciated that the various examples described herein may be adapted for use with vector-based images. In such examples, surface displacement distances may be calculated for discrete locations along the length and width of a vector based on (e.g., as a function of) a distance of each discrete location to a nearest edge or perimeter of the vector.

The system may generate a surface displacement map of the graphical element to be applied to a surface of a three-dimensional object. The system may, for example, generate a mesh file based on the surface displacement map that can be stored and applied to the surface of other three-dimensional objects for three-dimensional printing. In some instances, the system may directly transmit (e.g., in a compatible file format) the surface displacement map to a three-dimensional printer for printing.

Any number of different distance functions may be utilized to calculate the displacement distances of each pixel. For example, a linear function may be utilized to generate a chiseled or V-shaped, a step function may be utilized to generate vertical walls and a flat bottom (or top, in the case of positive surface displacement), a different step function may be utilized to generate multitiered steps. In other examples, nonlinear functions may be utilized to generate recesses or protrusions with curves. For instance, a root function may be used to generate a rounded recess or protrusion. Combinations of functions may be utilized to attain recesses and protrusions having any of a wide variety of shapes.

Because the surface displacement values for each pixel are defined relative to a nominal surface elevation (e.g., orthogonal to the surface) of each individual pixel, a surface displacement map and/or associated mesh file can be applied to a planar surface or a curved surface without redesign. Utilizing pixel interpolation techniques, a surface displacement map and/or associated mesh file can be resized for application to various surfaces having various contours.

The examples of the disclosure may be further understood by reference to the drawings, wherein like parts are designated by like numerals throughout. It will be readily understood that the components of the disclosed examples, as generally described and illustrated in the figures herein, could be arranged and designed in a wide variety of different configurations. Thus, the following detailed description of the examples of the systems and methods of the disclosure is not intended to limit the scope of the disclosure, as claimed, but is merely representative of possible examples of the disclosure.

In some cases, well-known features, structures, or operations are not shown or described in detail. Furthermore, the described features, structures, or operations may be combined in any suitable manner in various examples. It will also be readily understood that the components of the examples as generally described and illustrated in the figures herein could be arranged and designed in a wide variety of different configurations.

Some aspects of the systems and methods described herein may be implemented as computer-executable instructions (e.g., software), electronic circuitry and components (e.g., hardware), firmware, and/or combinations thereof. As used herein, a software module or component may include computer instructions or computer-executable code located within a memory device and/or transmitted as electronic signals over a system bus, wired network, or wireless network. A software module or component may, for instance, comprise multiple physical or logical blocks of computer instructions, which may be organized as a routine, program, object, component, data structure, etc., that performs tasks or implements particular data types.

Examples may be provided as a computer program product, including a non-transitory computer and/or machine-readable medium having stored thereon instructions that may be used to program a computer or another electronic device to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

FIG. 1A illustrates a flow diagram 100 of an example system to generate a mesh file or 3D-printed object that includes graphical elements with surface displacements defined by a distance-to-edge function. The system may receive, at 102, graphical elements in a nonimage (e.g., not pixel-based format). For example, the system may receive text in an American Standard Code for Information Interchange (ASCII) encoding. The system may rasterize, at 104, the graphical elements to generate an image graphical element (e.g., a pixel-based graphical element).

The system may the utilize a distance-to-edge function (contextually referred to herein in some instances as "a distance function" or simply "a function") to determine, at 106, a surface displacement distance for each pixel of the image graphical element. The distance function may be signed positive or negative to generate protrusions or recesses, respectively, from the surface. The system may generate, at 108, a surface displacement map specifying the surface displacement distances of each pixel of the image graphical element.

In some examples, the system may use the surface displacement map to generate a mesh file, at 110, that can be applied to the surface of other objects for three-dimensional printing, at 112. In other instances, the surface displacement map may be used to directly print the graphical element, at 112, as part of a three-dimensional object.

Figure 1B:
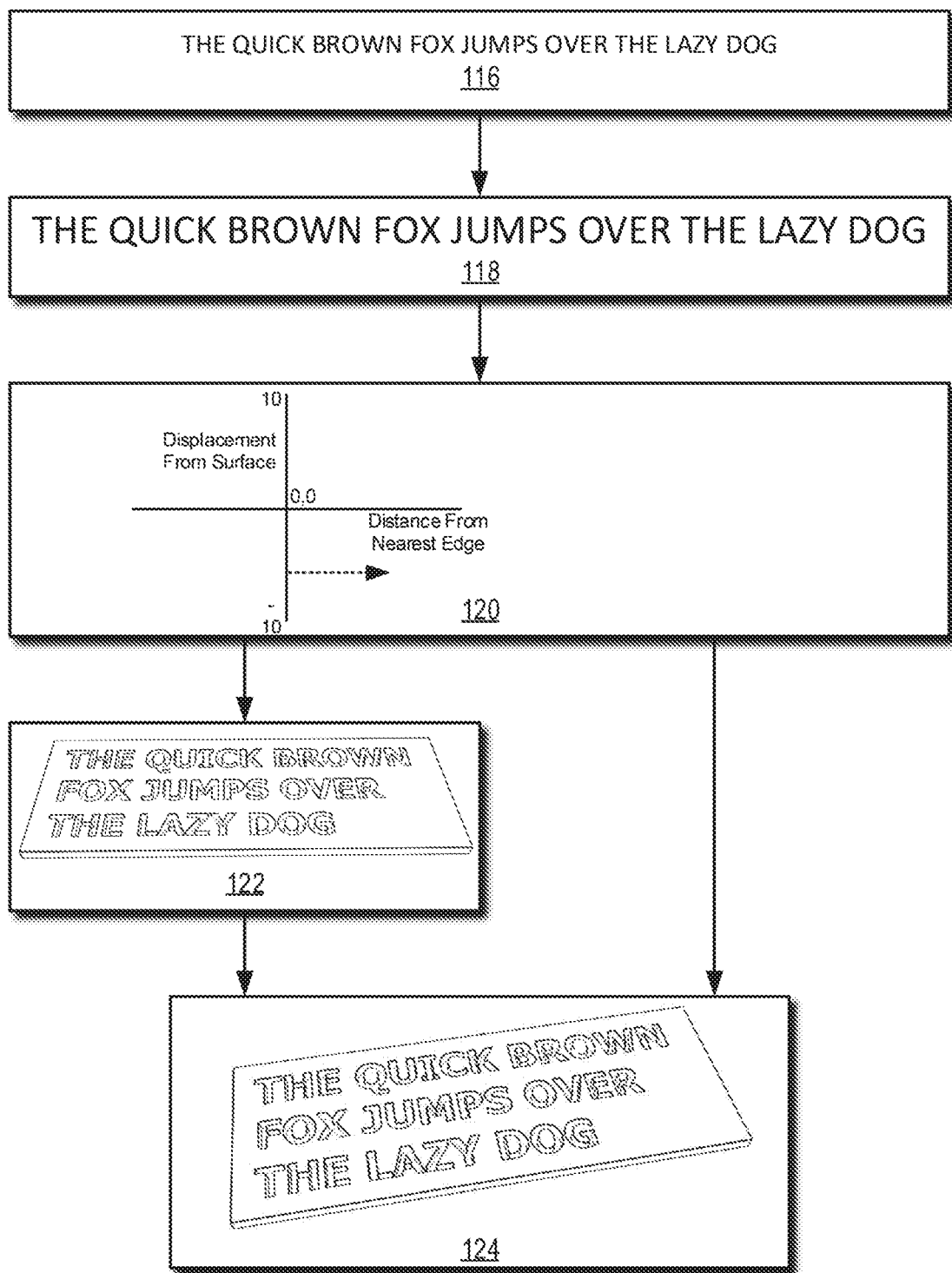
FIG. 1B illustrates an example implementation of the flow diagram described in conjunction with FIG. 1A.

FIG. 1B illustrates an example implementation of the flow diagram described in conjunction with FIG. 1A. At 116, the system receives the string of text "THE QUICK BROWN FOX JUMPS OVER THE LAZY DOG" in an ASCII-encoded graphical element. At 118, the string of text is rasterized to generate a pixel-based image of the same string of text as an image graphical element. At 120, a negative step function is applied to determine a negative surface displacement for each pixel of the image graphical element. The negative step function defines a negative surface displacement for each pixel of the image graphical element as a function of a distance of each pixel of the image graphical to a nearest edge pixel.

At 122, the system may generate a mesh of the graphical element representing the negative surface displacements forming the recessed graphical element on three horizontal lines. At 124, the graphical element is printed on the surface of a three-dimensional block. In various example, the system may automatically select and/or a user may select or define the distance function to form a specific recess profile or protrusion profile. Similarly, the system may automatically determine and/or the user may select or define the number of lines on which to place text, apply a cropping to the graphical element, and/or repeat the graphical element more than once.

Figure 2A:
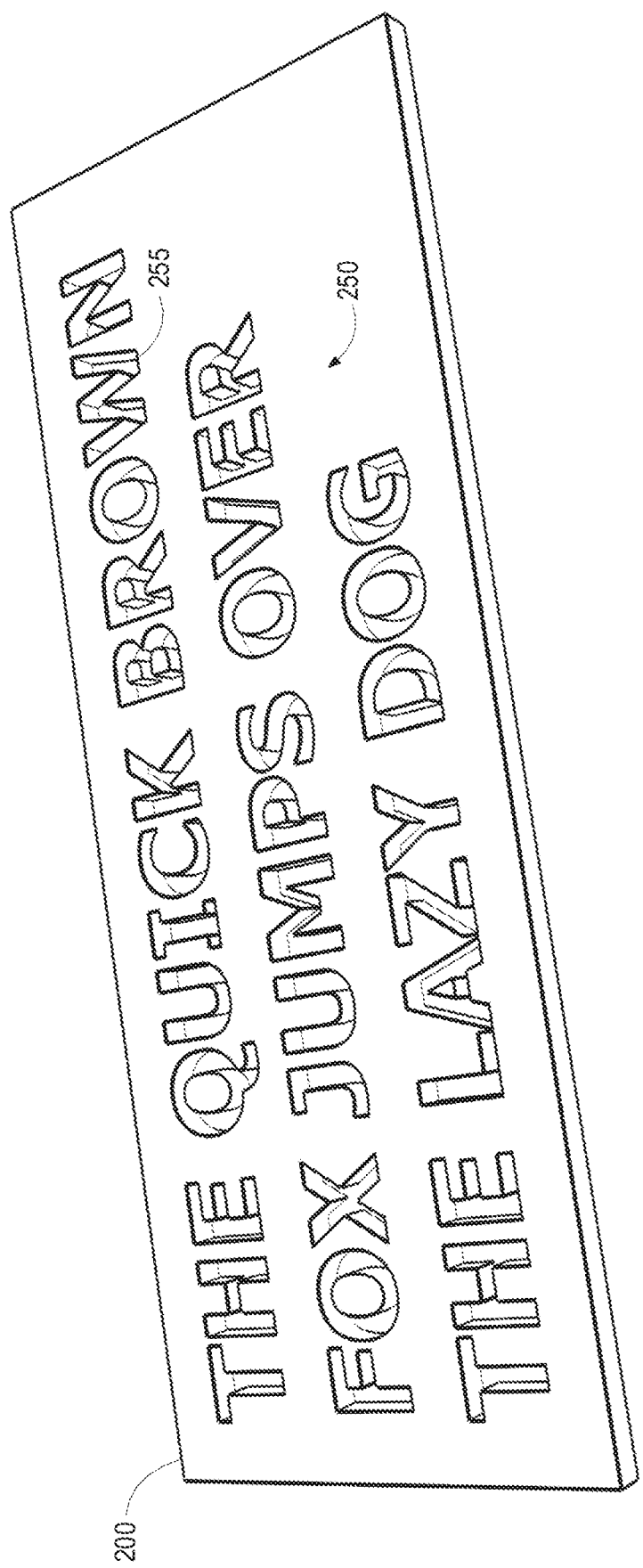
FIG. 2A illustrates a graphical element mesh file printed on a planar 3D-printed object in which the graphical element surface displacements are based on a distance-to-edge function.

FIG. 2A illustrates a graphical element mesh file printed on a planar three-dimensionally-printed object 200 in which the graphical element surface displacements are based on a distance-to-edge function. As illustrated, each letter 255 of the text phrase 250 is recessed in the planar surface of the three-dimensionally-printed object 200.

Figure 2B:
FIG. 2B illustrates the graphical element mesh file printed on a curved 3D-printed object.

FIG. 2B illustrates the graphical element mesh file printed on a curved 3D-printed object 201. Again, each letter 255 of the text phrase 250 is recess in the curved surface of the three-dimensionally-printed object 201. As illustrated, since the surface displacement values for each pixel are defined relative to a nominal surface elevation, the mesh file can be equally applied to the curved surface of the object 201 and the planar surface of the object 200 (FIG. 2A) without redesign.

Figure 3:
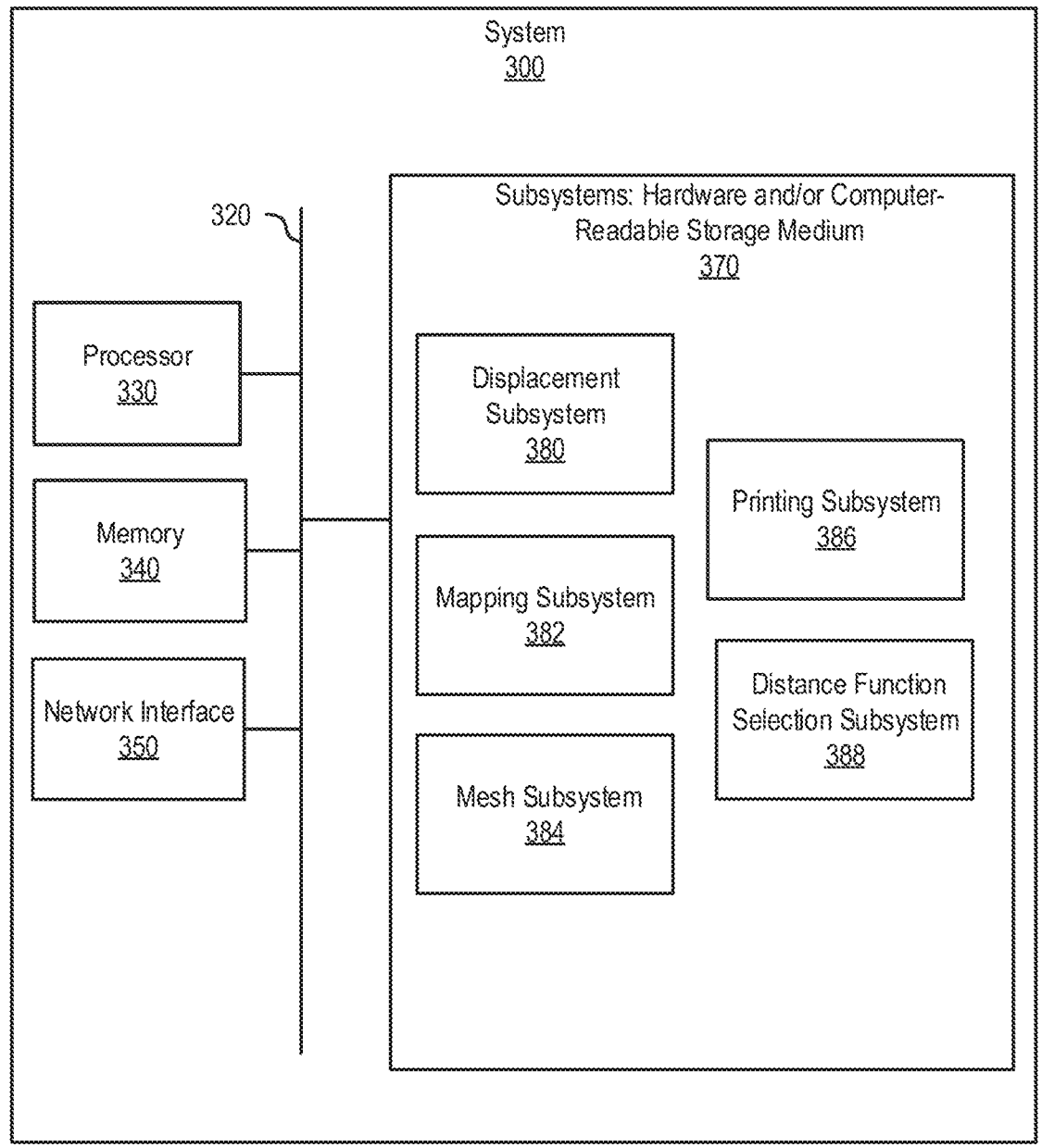
FIG. 3 illustrates a computer system for determining graphical element surface displacements using a distance-to-edge function.

FIG. 3 illustrates a computer system 300 for determining graphical element surface displacements using a distance-to-edge function. As illustrated, the system may include a processor 330, memory 340, network interface 350, and various subsystems 370 connected via a bus 320. The subsystems 370 may, for example, be implemented as instructions on a non-transitory computer-readable storage medium that can be executed by the processor 330 and/or communicated via the network interface 350 for execution.

As illustrated, the system 300 may include a displacement subsystem 380, a mapping subsystem 382, a mesh subsystem 384, a printing subsystem 386, and a distance function selection subsystem 388. The displacement subsystem 380 may determine surface displacement distances for each pixel of an image of a graphical element based on a function of the distance of each pixel from an edge of the image of the graphical element (e.g., the distance of each pixel to the nearest edge pixel).

The mapping subsystem 382 may generate a surface displacement map of the graphical element to be applied to a surface of a three-dimensional object. The mesh subsystem 384 may generate a mesh file based on the surface displacement map. A printing subsystem 386 may transmit the mesh file to a three-dimensional printer for printing on a planar or curved surface of the three-dimensional object. In some instances, the distance function selection subsystem 388 may include one or more preset distance functions from which a user may select or from which the system may automatically select. In some instances, the distance function selection subsystem 388 may receive a custom distance function from user.

Figure 4A:
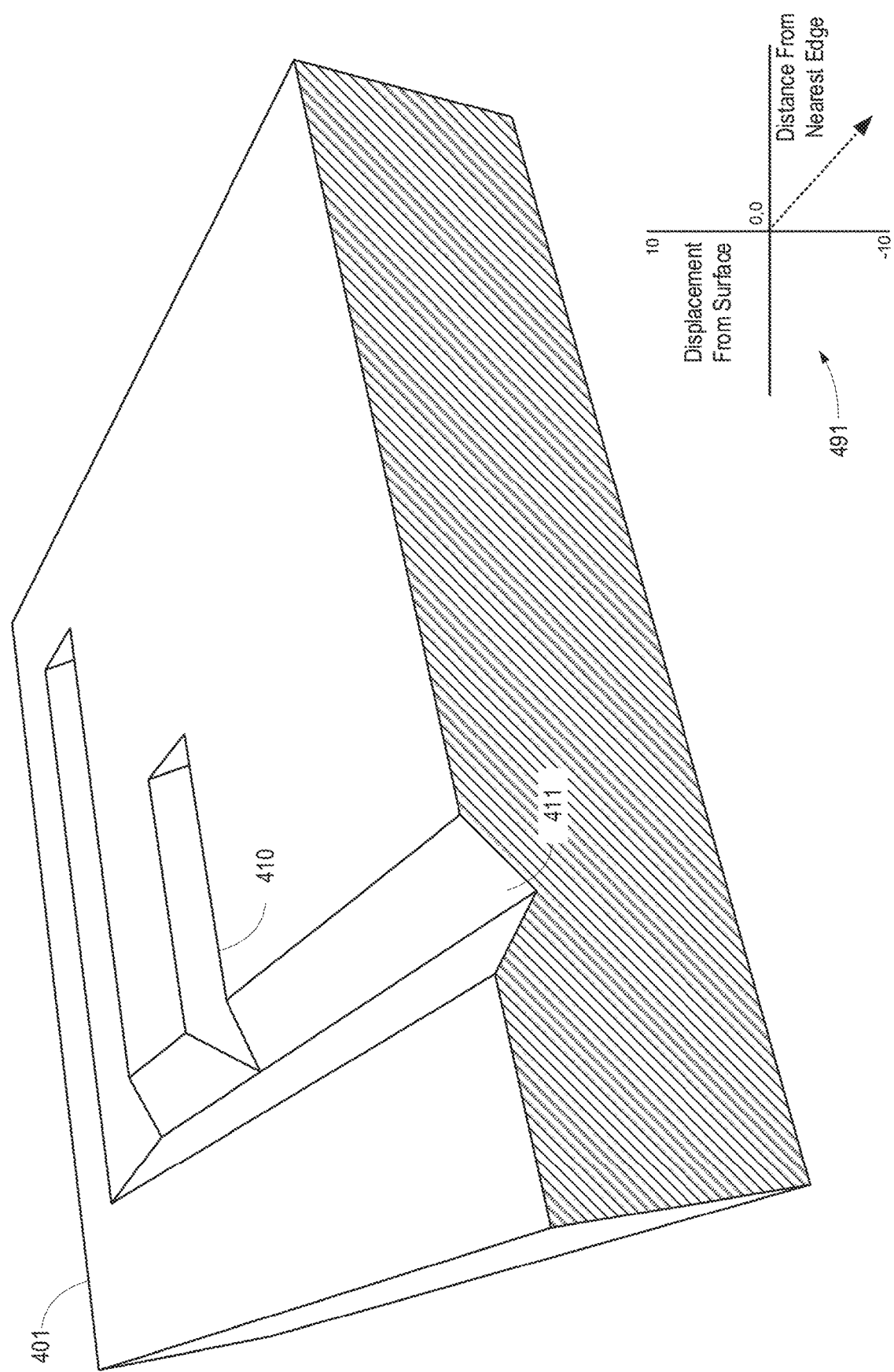
FIG. 4A illustrates an example of a graphical element with surface displacements based on a negative linear function.

FIG. 4A illustrates an example of a graphical element 410 (the letter "F") printed on a surface of an object 401 with surface displacements based on a negative linear function 491. As illustrated, the system uses the negative linear function 491 to form the graphical element 410 as a V-shaped recess 411 in the surface of the object 401.

Figure 4B:
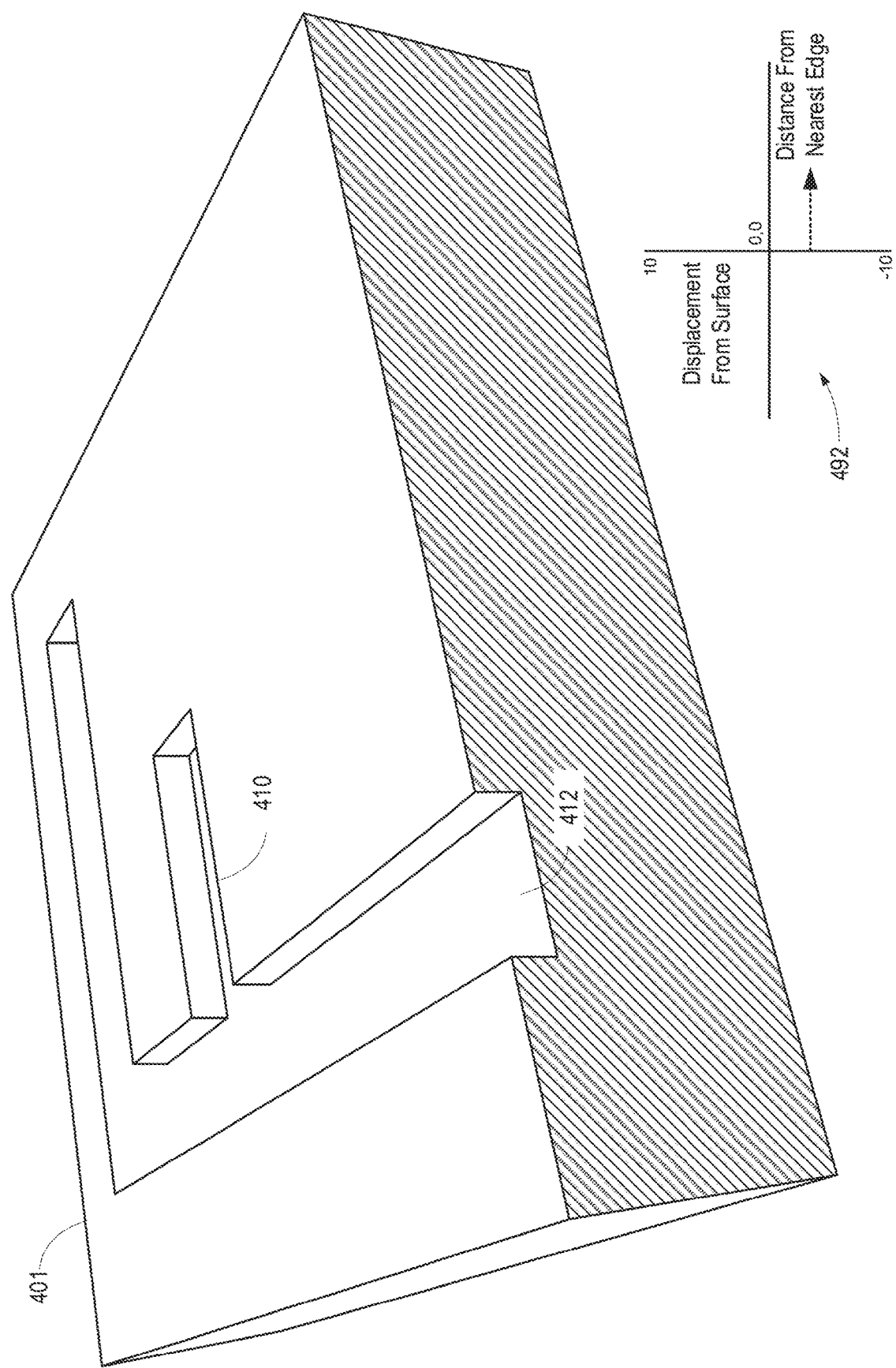
FIG. 4B illustrates an example of the graphical element with surface displacements based on a negative step function.

FIG. 4B illustrates an example of the graphical element 410 printed on the surface of the object 401 with surface displacements based on a negative step function 492. In this example, the system uses the negative step function 492 to form the graphical element 410 as a square shaped recess 412 in the surface of the object 401.

Figure 4C:
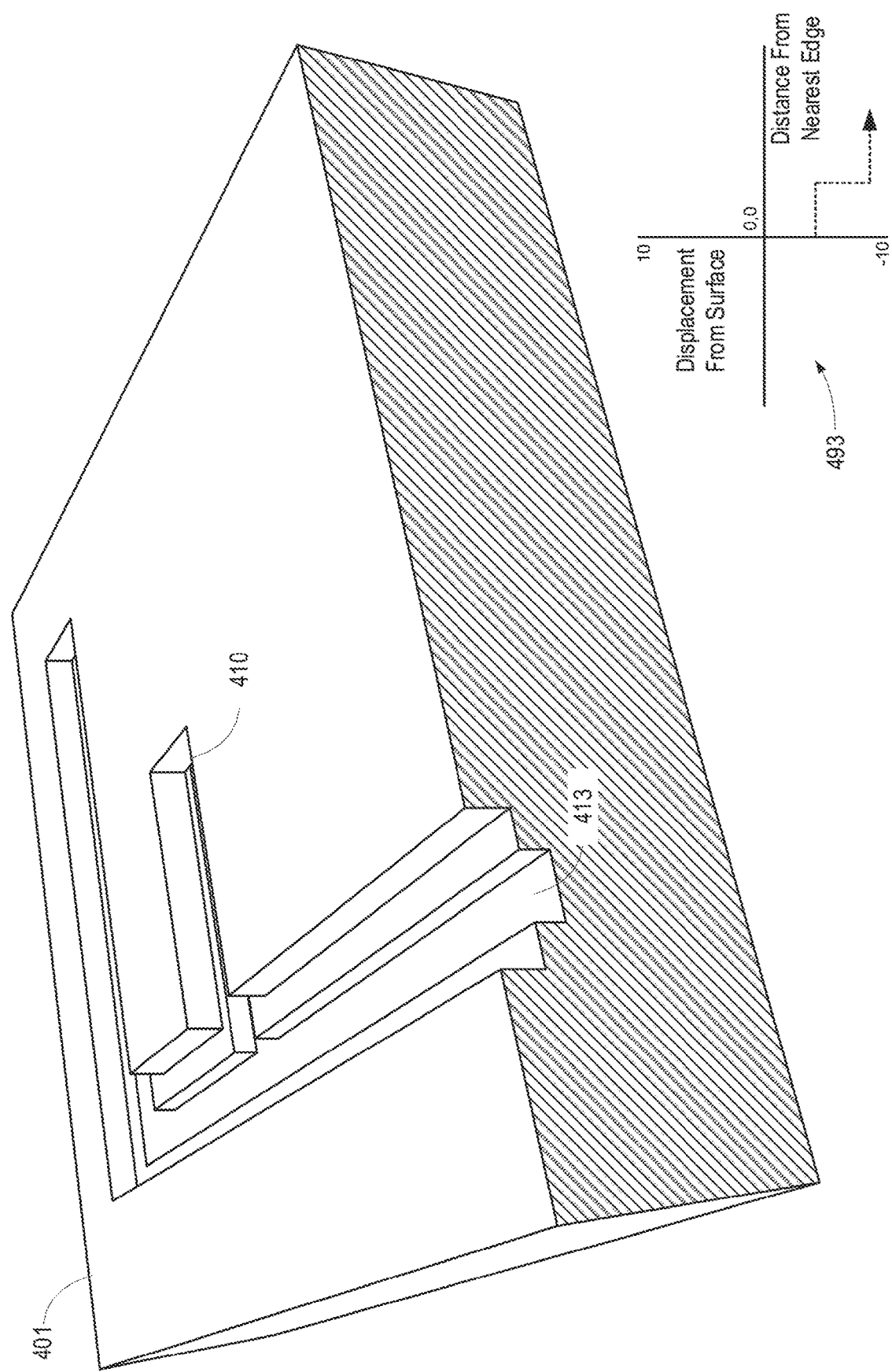
FIG. 4C illustrates another example of the graphical element with surface displacements based on another negative step function.

FIG. 4C illustrates another example of the graphical element 410 printed on the surface of the object 401 with surface displacements based on a multitier negative step function 493. In this example, the system uses the multitier step function 493 to form the graphical element 410 as a stair-step shaped recess 413 in the surface of the object 401.

Figure 4D:
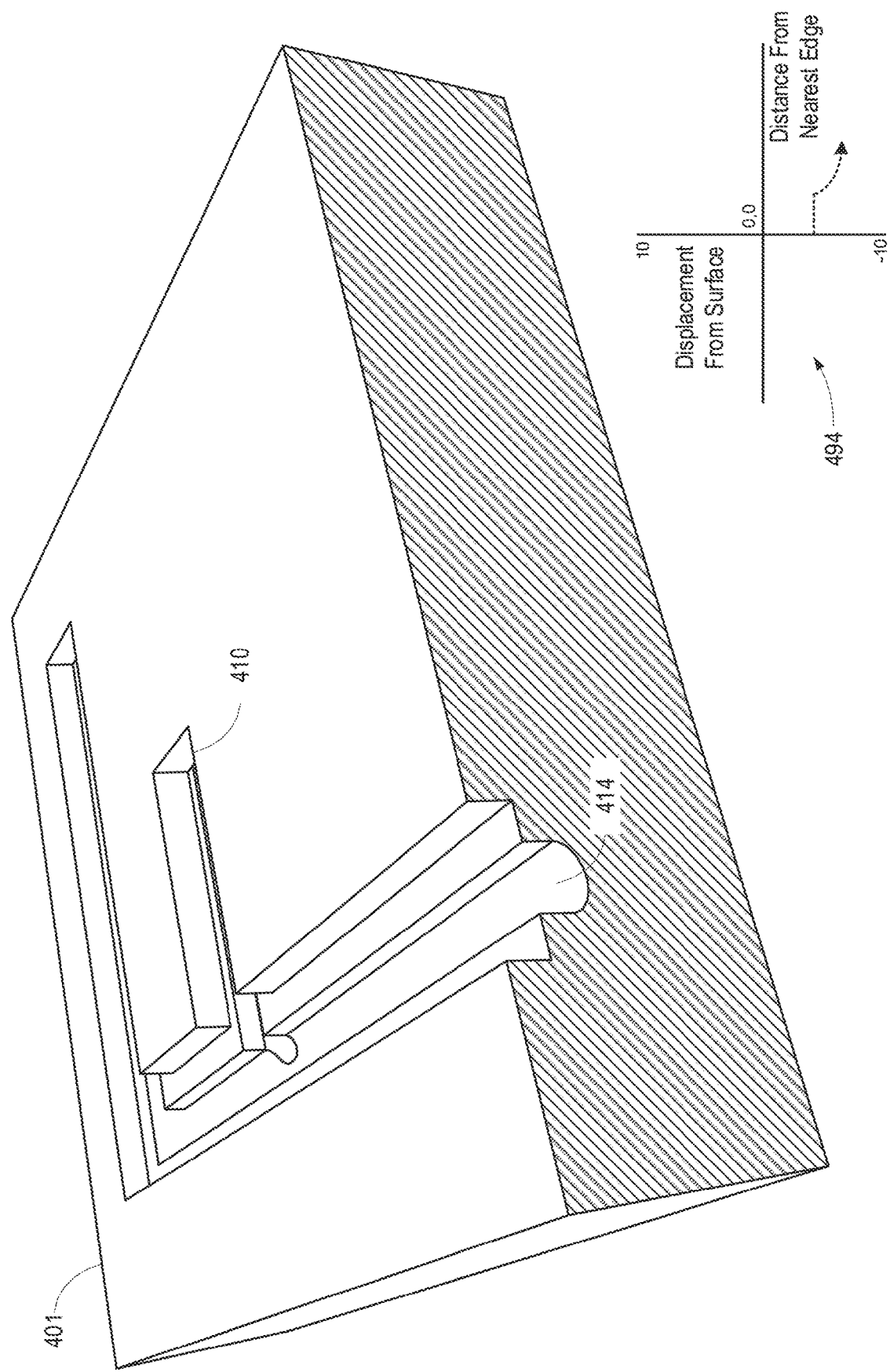
FIG. 4D illustrates an example of the graphical element with surface displacements based on a negative stepped root function.

FIG. 4D illustrates an example of the graphical element 410 printed on the surface of the object 401 with surface displacements based on a negative stepped root function 494. In this example, the system uses the negative stepped root function 494 to form the graphical element 410 as a stair-step shaped recess with a rounded bottom 414.

Figure 4E:
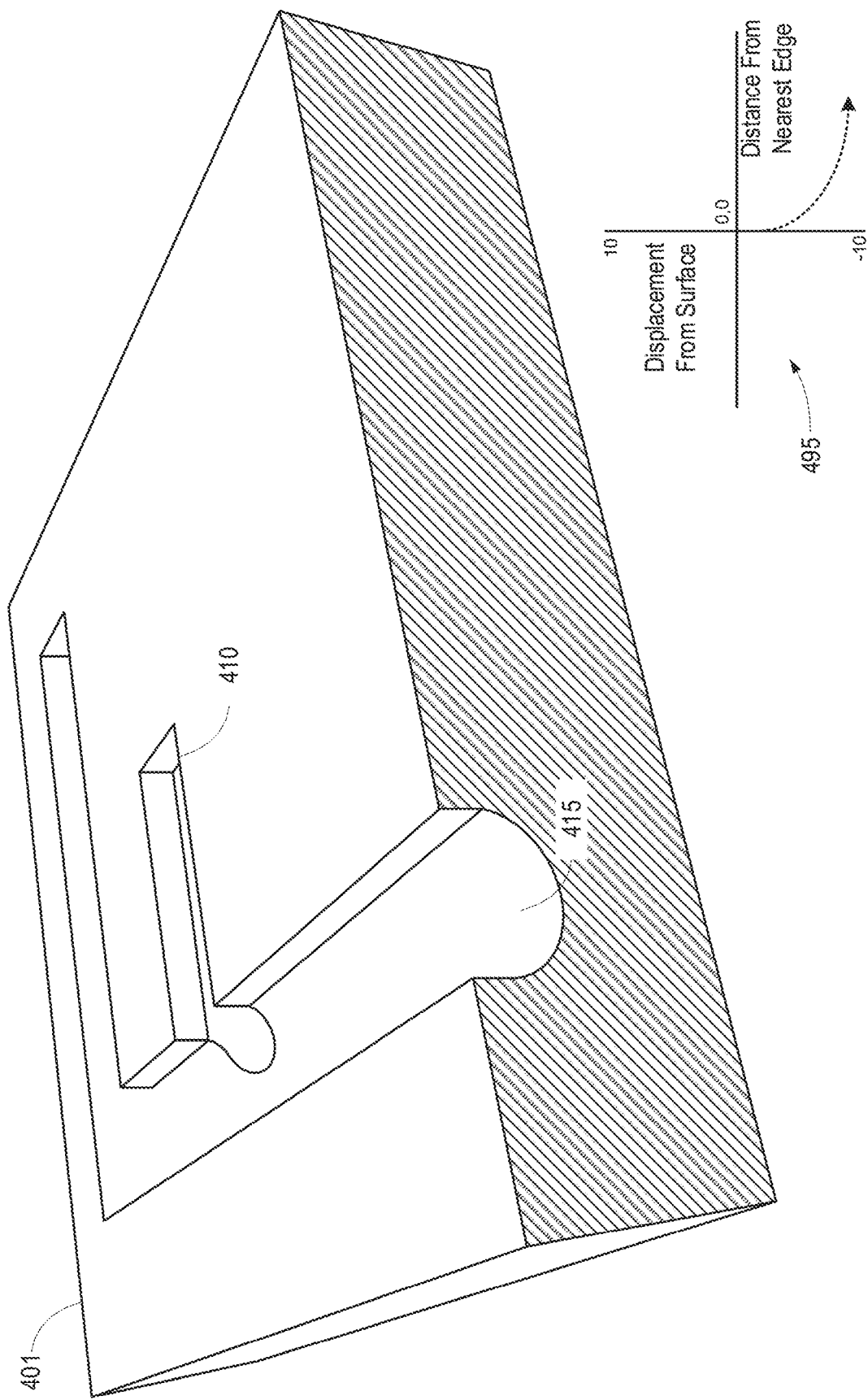
FIG. 4E illustrates another example of the graphical element with surface displacements based on another negative root function.

FIG. 4E illustrates another example of the graphical element 410 printed on the surface of the object 401 with surface displacements based on another example of a negative root function 495. The system uses the negative root function 495 to form the graphical element 410 as a rounded recess 415.

Figure 5A:
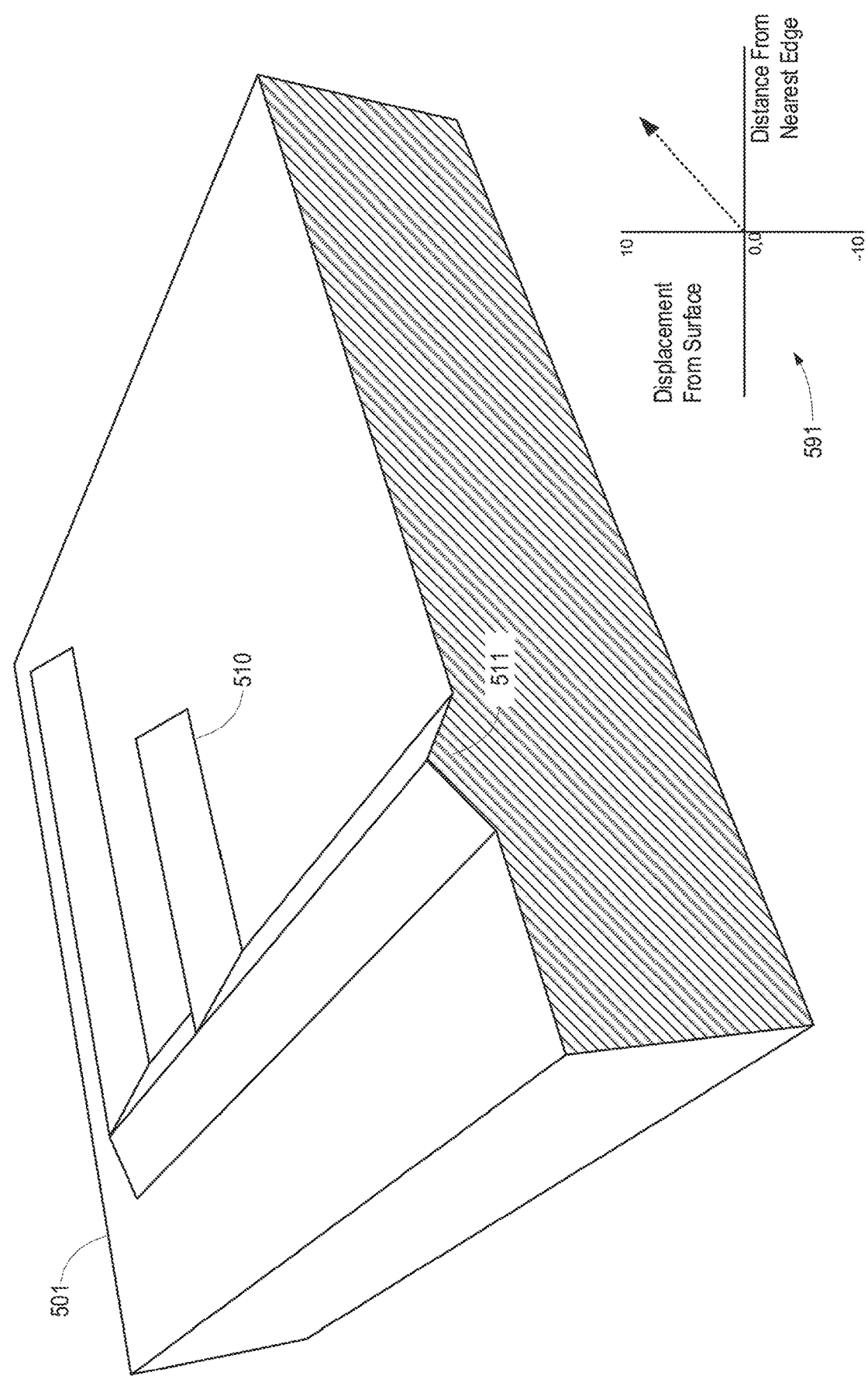
FIG. 5A illustrates an example of a graphical element with surface displacements based on a positive linear function.

FIG. 5A illustrates an example of a graphical element 510 (again, the letter "F") printed on the surface of an object 501 with surface displacements based on a positive linear function 591. As illustrated, the system uses the positive linear function 591 to form the graphical element 410 as a V-shaped protrusion 511 on the surface of the object 501.

Figure 5B:
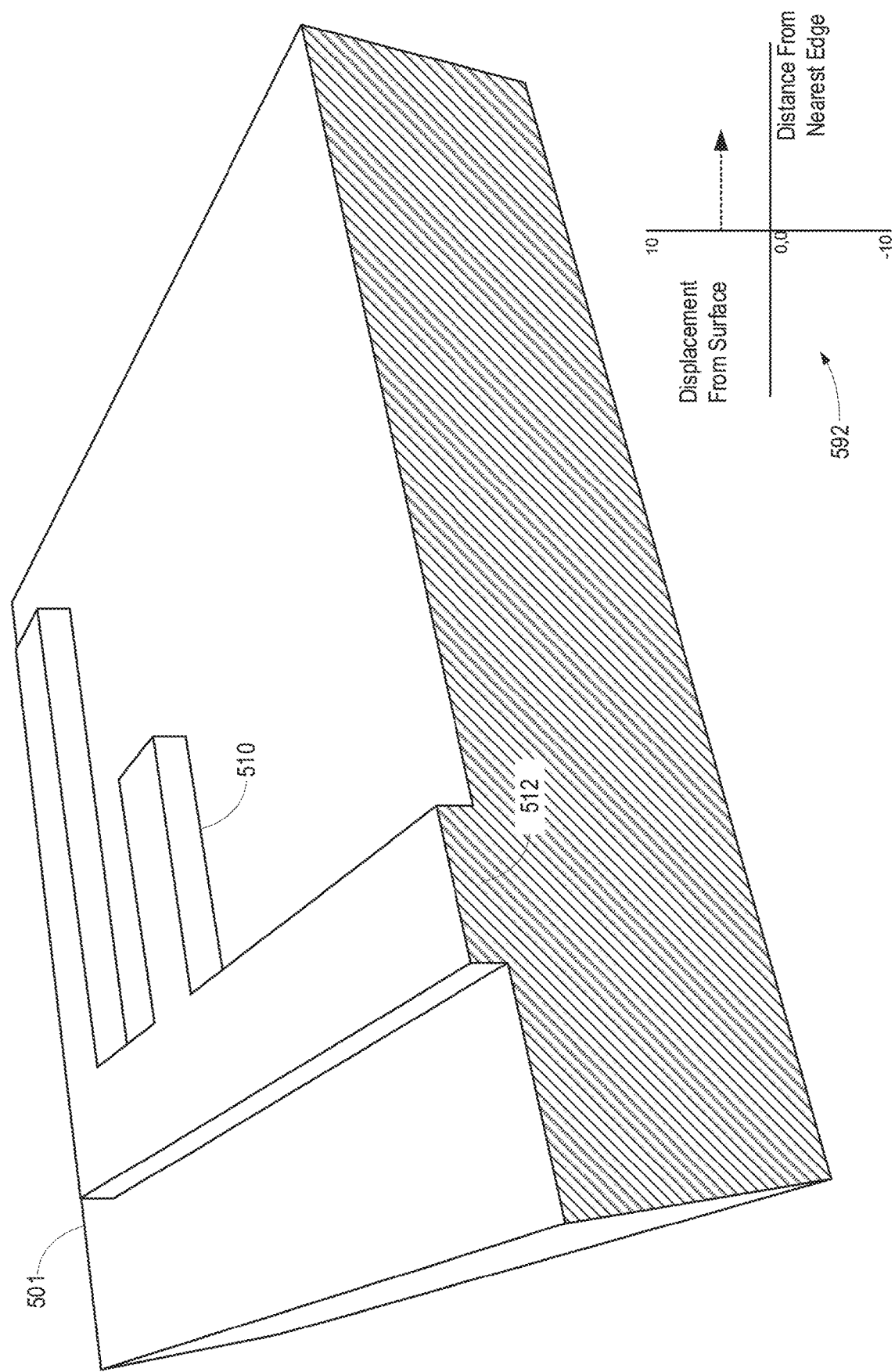
FIG. 5B illustrates an example of the graphical element with surface displacements based on a positive step function.

FIG. 5B illustrates an example of the graphical element 510 printed on the surface of the object 501 with surface displacements based on a positive step function 592. In this example, the system uses the negative step function 592 to form the graphical element 510 as a square shaped protrusion 512 on the surface of the object 501.

Figure 5C:
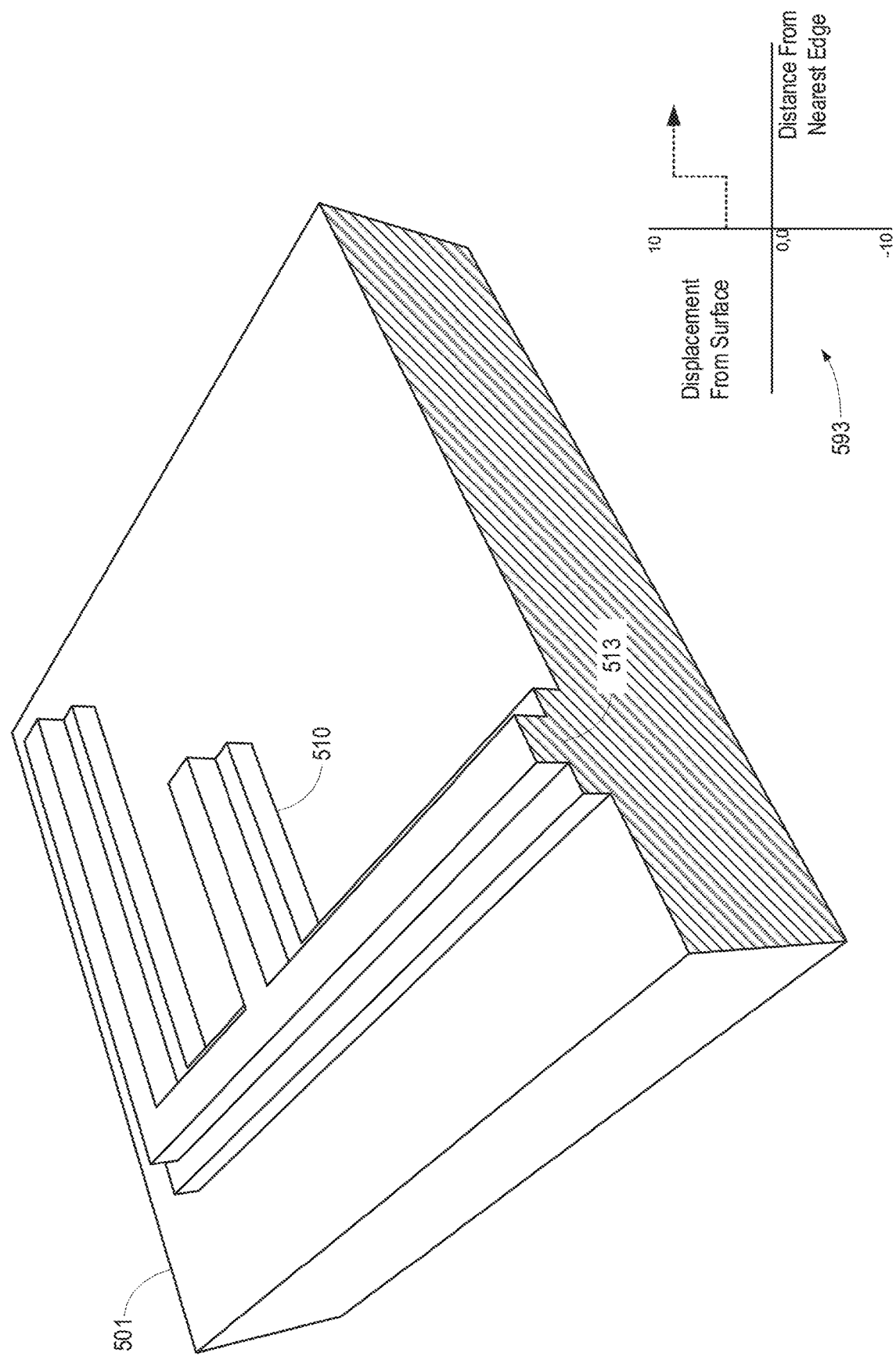
FIG. 5C illustrates another example of the graphical element with surface displacements based on another positive step function.

FIG. 5C illustrates another example of the graphical element 510 printed on the surface of the object 501 with surface displacements based on a multitier negative step function 593. In this example, the system uses the multitier step function 593 to form the graphical element 510 as a stair-step shaped protrusion 513 on the surface of the object 501.

Figure 5D:
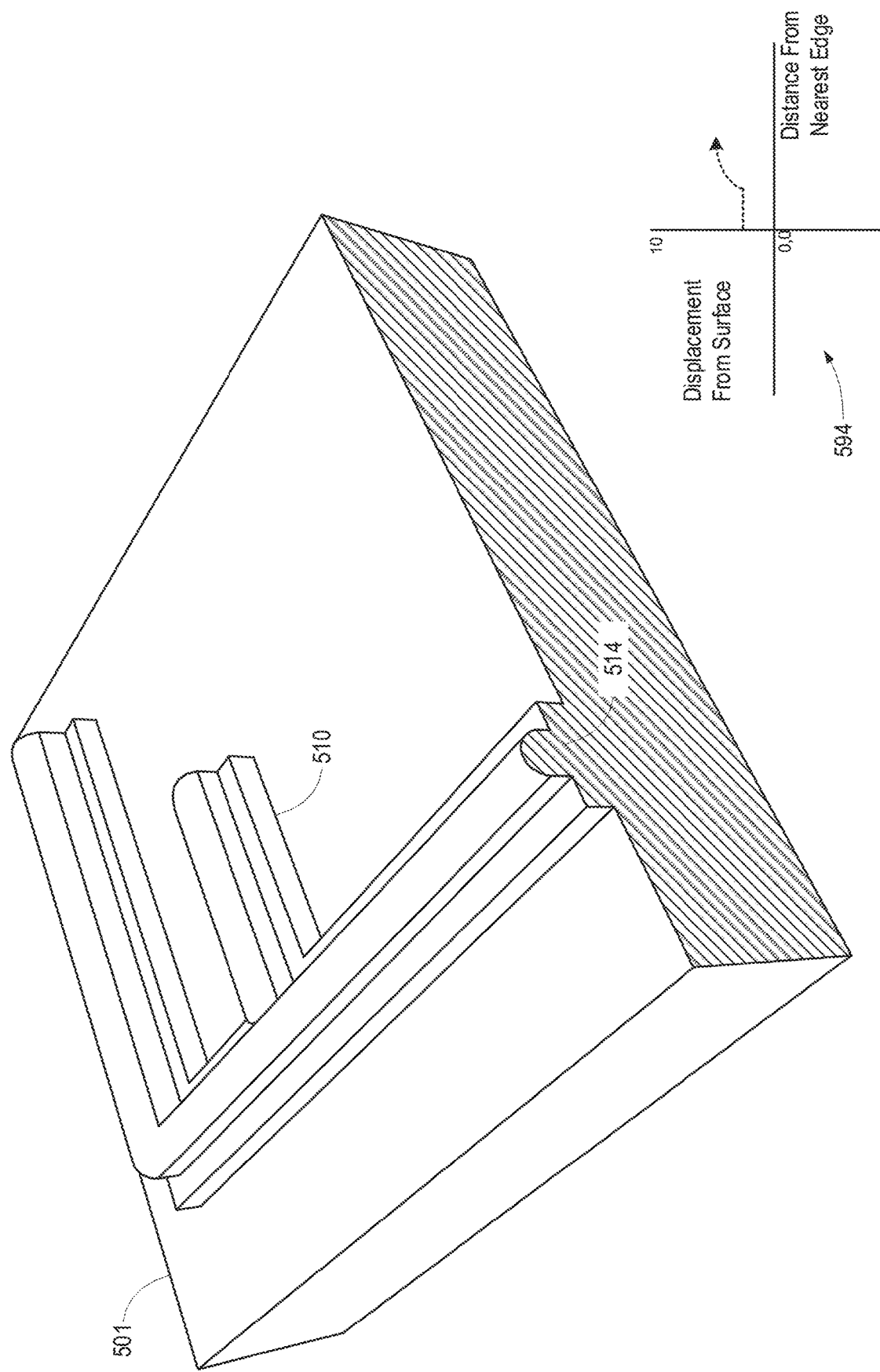
FIG. 5D illustrates an example of the graphical element with surface displacements based on a positive root function.

FIG. 5D illustrates an example of the graphical element 510 printed on the surface of the object 501 with surface displacements based on a negative stepped root function 594. In this example, the system uses the negative stepped root function 594 to form the graphical element 510 as a stair-step shaped protrusion with a rounded top 514.

Figure 5E:
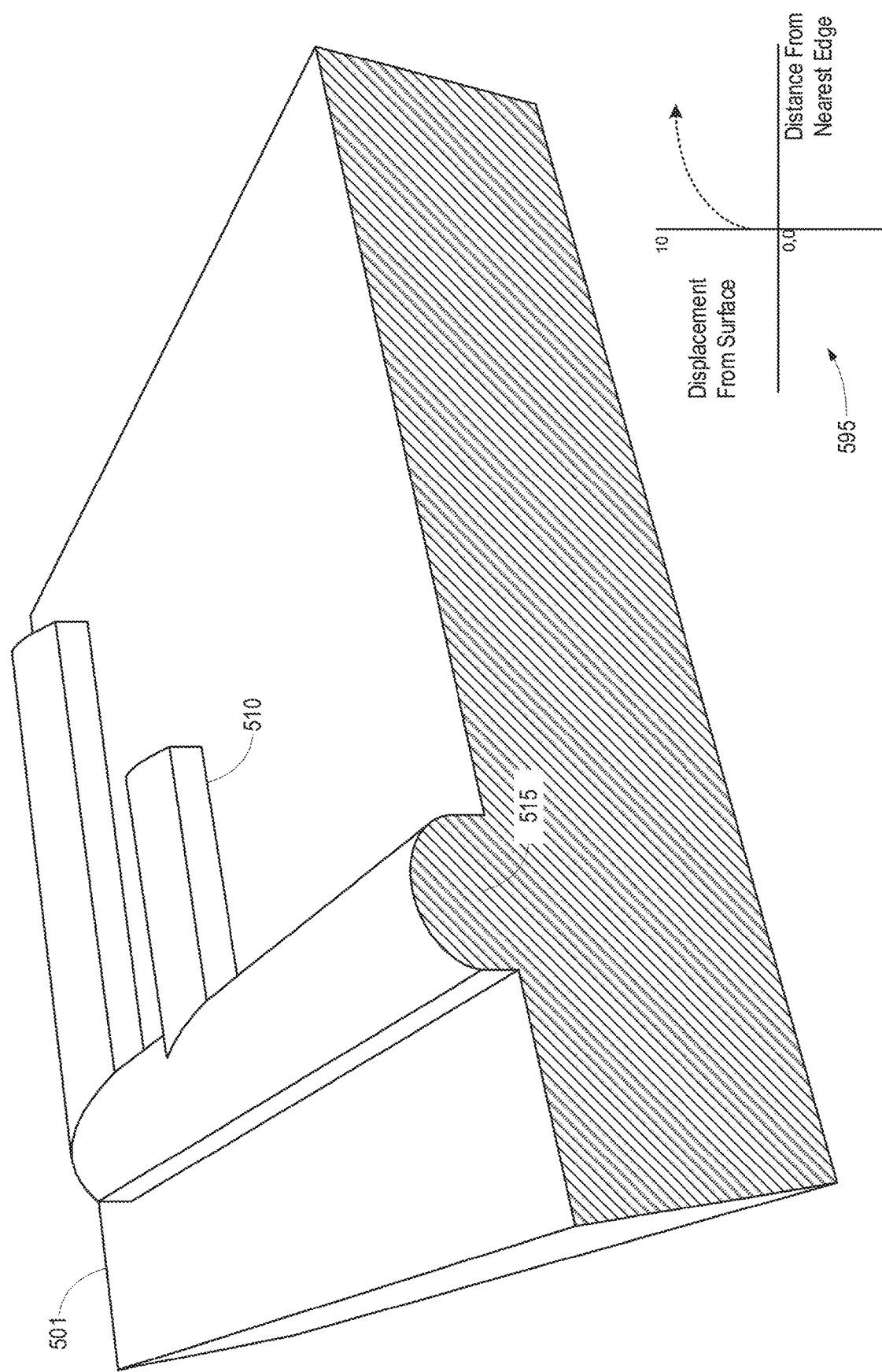
FIG. 5E illustrates another example of the graphical element with surface displacements based on another positive root function.

FIG. 5E illustrates another example of the graphical element 510 printed on the surface of the object 501 with surface displacements based on another example of a negative root function 595. The system uses the negative root function 595 to form the graphical element 510 as a rounded protrusion 515.

Figure 6:
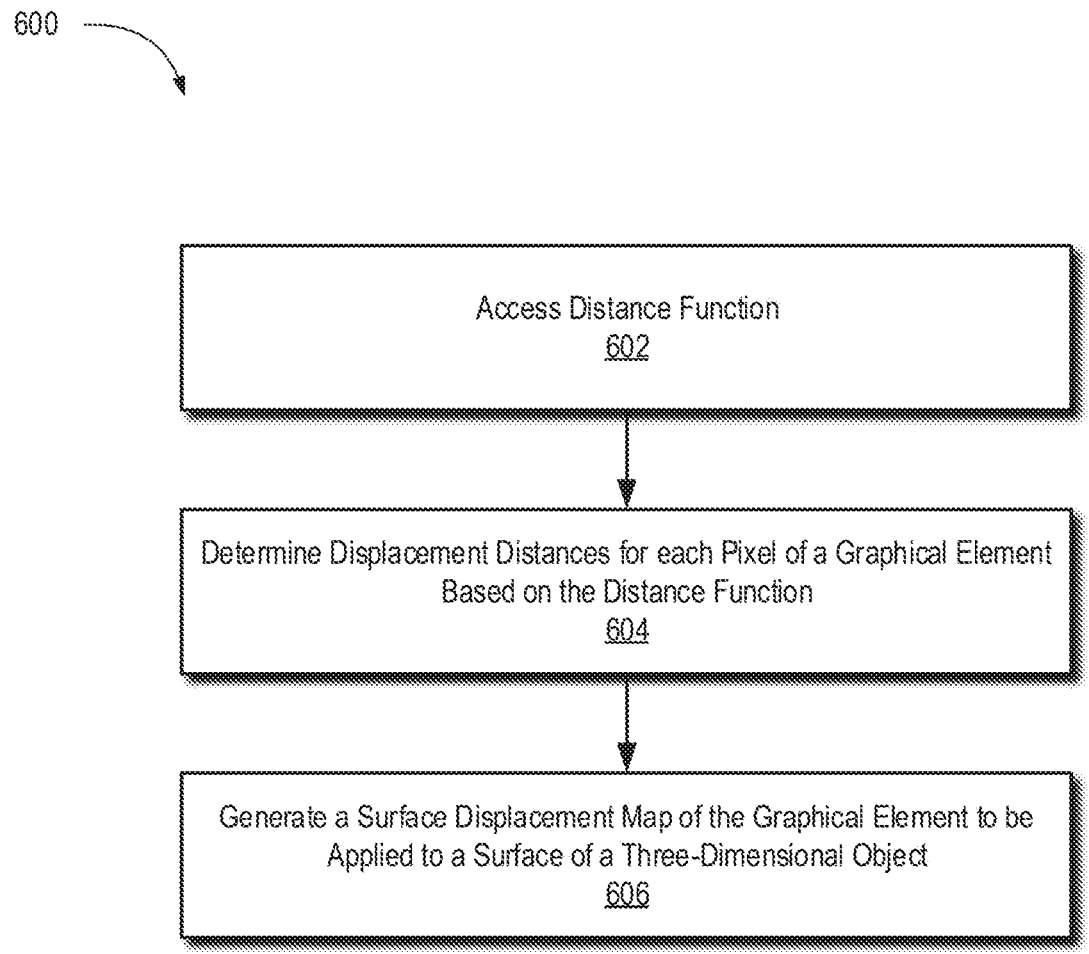
FIG. 6 illustrates a flow chart of a method to determine surface displacements for a graphical element using distance-to-edge functions.

FIG. 6 illustrates a flow chart of a method 600 to determine surface displacements for a graphical element using a distance-to-edge function. The system may access, at 602, a distance function. For example, the system may retrieve a stored distance function or receive a distance function from a user. In some examples, the user may select a distance function from a set of stored distance functions or define a custom distance function.

The system may determine, at 604, displacement distances for each pixel of a graphical element using the selected distance function. The system may generate, at 606, a surface displacement map of the graphical element to be applied to the surface of a three-dimensional object.

While specific examples and applications of the systems and methods described herein are illustrated and described in detail, the disclosure is not limited to the precise configurations and components as described. Many changes may be made to the details of the above-described examples without departing from the underlying principles of this disclosure. The scope of the present disclosure should, therefore, be understood to encompass at least the following claims.

What is claimed is:

1. A method for generating a surface displacement map of a graphical element, wherein the surface displacement map is to be applied to a surface of a three-dimensional object, the method comprising:
    calculating surface displacement distance for each pixel of an image of a graphical element using a distance function based on distance of each respective pixel to a nearest edge pixel of the image of the graphical element, wherein the distance function is one of:
        a negative function, such that the graphical element is to be applied as a recess in the surface of the three-dimensional object; or
        a positive function, such that the graphical element is to be applied as a protrusion from the surface of the three-dimensional object; and
    generating the surface displacement map of the graphical element to be applied to the surface of the three-dimensional object for printing the image of the graphical element on the surface of the three-dimensional object.

2. The method of claim 1, further comprising:
    generating a mesh file based on the surface displacement map.

3. The method of claim 1, further comprising:
    transmitting the surface displacement map to a three-dimensional printer for the printing on the surface of the three-dimensional object.

4. The method of claim 1, wherein the distance function is one of a linear function, a step function, a root function, or a combination thereof.

5. The method of claim 1, wherein the graphical element comprises at least one of: a letter, a number, an alphanumeric character, an icon, an image, a pattern, and a design.

6. The method of claim 1, further comprising:
    receiving the graphical element as a non-image file; and
    rasterizing the non-image file of the graphical element to generate the image of the graphical element prior to calculating the surface displacement distance of the each respective pixel of the image of the graphical element.

7. The method of claim 6, wherein the non-image file is a non-image text file.

8. A system, comprising:
    a displacement subsystem configured to calculate a surface displacement distance for each pixel of an image of a graphical element using a distance function based on a distance of each respective pixel to a nearest edge pixel of the image of the graphical element, wherein the distance function is one of:
        a negative function, such that the graphical element is to be applied as a recess in the surface of the three-dimensional object; or
        a positive function, such that the graphical element is to be applied as a protrusion from the surface of the three-dimensional object; and
    a mapping subsystem configured to generate a surface displacement map of the graphical element to be applied to a surface of a three-dimensional object for printing the image of the graphical element on the surface of the three-dimensional object.

9. The system of claim 8, wherein the distance function is one of a linear function, a step function, a root function, or a combination thereof.

10. The system of claim 8, further comprising:
    a mesh subsystem configured to generate a mesh file based on the surface displacement map.

11. The system of claim 10, further comprising:
    a printing subsystem configured to transmit the mesh file to a three-dimensional printer for printing the image of the graphical element on the surface of the three-dimensional object, wherein the surface of the three dimensional object is a planar surface.

12. The system of claim 10, further comprising:
    a printing subsystem configured to transmit the mesh file to a three-dimensional printer for printing the image of the graphical element on the surface of the three-dimensional object, wherein the surface of the three-dimensional object is a curved surface, and wherein the surface displacement distance for the each pixel is defined relative to a normal surface elevation of the each respective pixel.

13. A system, comprising:
    a processor; and
    a non-transitory computer-readable medium with instructions stored thereon that, when executed by the processor, cause the system to:
        calculate surface displacement distance for each pixel of an image of a graphical element using a distance function based on a distance of each respective pixel to a nearest edge pixel of the image of the graphical element, wherein the distance function is one of:
            a negative function, such that the graphical element is to be applied as a recess in the surface of the three-dimensional object; or
            a positive function, such that the graphical element is to be applied as a protrusion from the surface of the three-dimensional object; and
        generate a surface displacement map of the graphical element to be applied to a surface of a three-dimensional object for printing the image of the graphical element on the surface of the three-dimensional object.

14. The system of claim 13, wherein the distance function comprises one of a linear function, a step function, a root function, or a combination thereof.

15. The system of claim 13, wherein the image of the graphical element is generated by rasterizing a non-image file of the graphical element.

16. The system of claim 15, wherein the non-image files is a non-image text file.

* * * * *